United States Patent [19]
Ikeura

[11] 4,371,050
[45] Feb. 1, 1983

[54] FUEL-CUT CONTROL APPARATUS

[75] Inventor: Kenji Ikeura, Yokosuka, Japan

[73] Assignee: Nissan Motor Company, Limited, Yokohama, Japan

[21] Appl. No.: 121,785

[22] Filed: Feb. 15, 1980

[30] Foreign Application Priority Data

Feb. 16, 1979 [JP] Japan .................................. 54-16088
Mar. 30, 1979 [JP] Japan .................................. 54-38232

[51] Int. Cl.[3] .......................... B60K 41/02; F02D 5/00
[52] U.S. Cl. ...................................... 180/271; 74/866; 123/198 DB; 364/431.09
[58] Field of Search ............... 180/178, 179, 284, 271; 123/198 DB, 478, 480, 198 F; 74/866; 364/431.09, 431.05

[56] References Cited

U.S. PATENT DOCUMENTS

| | | | |
|---|---|---|---|
| 3,463,130 | 8/1969 | Reichardt et al. | 123/198 F |
| 4,061,055 | 12/1977 | Iizuka et al. | 74/866 |
| 4,062,328 | 12/1977 | Konno | 123/198 DB |
| 4,102,316 | 7/1978 | Valbert | 123/198 DB |
| 4,192,279 | 3/1980 | Maisch et al. | 123/198 DB |
| 4,207,845 | 6/1980 | Semmler | 123/198 DB |

FOREIGN PATENT DOCUMENTS

| | | | |
|---|---|---|---|
| 2444695 | 4/1975 | Fed. Rep. of Germany . | |
| 2620986 | 11/1976 | Fed. Rep. of Germany . | |
| 2615504 | 10/1977 | Fed. Rep. of Germany . | |
| 2633617 | 2/1978 | Fed. Rep. of Germany . | |
| 2101674 | 3/1972 | France | 123/198 F |
| 1161632 | 8/1969 | United Kingdom | 123/198 F |

*Primary Examiner*—David M. Mitchell
*Attorney, Agent, or Firm*—Schwartz, Jeffery, Schwaab, Mack, Blumenthal & Koch

[57] ABSTRACT

A fuel cut-off control apparatus is disclosed which is responsive to various vehicle running conditions for cutting off the flow of fuel from a fuel supply system to an engine. The fuel cut-off control apparatus is adapted to interrupt the fuel flow when the throttle valve is in its fully closed position, the engine speed is above a first engine speed reference level, and the vehicle speed is above a first vehicle speed reference level. The fuel cut-off control apparatus is adapted to admit the fuel flow to the engine when the throttle valve is in its open positions, the engine speed is below a second engine speed reference level lower than the first engine speed reference level, or the vehicle speed is below a second vehicle speed reference level lower than the first vehicle speed reference level.

10 Claims, 4 Drawing Figures

FUEL-CUT CONTROL APPARATUS

BACKGROUND OF THE INVENTION

1. Field of the Invention

This invention relates to a fuel supply system for use in an automotive vehicle equipped with an internal combustion engine and, more particularly, to such a fuel supply system responsive to various vehicle running conditions for shutting off the flow of fuel for the engine.

2. Description of the Prior Art

Fuel supply systems such as fuel injection system or carburetor incorporated in automotive vehicle internal combustion engine have been provided which have fuel cut-off control apparatus responsive to various vehicle running conditions for shutting off the flow of fuel for the engine during deceleration for higher fuel economy and exhaust gas purifying performance.

Such conventional fuel cut-off control apparatus has inputs from an engine speed sensor and an engine temperature sensor for comparing the actual engine speed with high and low reference levels varying with engine temperature. The conventional fuel cut-off control apparatus also have an additional input from an idle switch adapted to become conductive when the throttle valve is in its fully closed position or the accelerator pedal is released. During deceleration, the fuel cut-off control apparatus cuts off the flow of fuel from the fuel supply system to the engine if the idle switch is turned on at an engine speed above the high reference level and releases the fuel-cut condition when the engine speed falls below the low reference level.

One difficulty with such conventional apparatus is their tendency toward hunting which results in repeated interruption and admission of the fuel flow to the engine in a short time especially when the engine is warming-up or running with its transmission placed in a low or second gear position. This causes unsmooth vehicle running and has an adverse effect upon engine durability and exhaust gas purifying performance.

This is due to the hunting provision of a fast-idle machanism associated with the engine for increasing the engine speed to ensure stable engine rotation during engine warming-up conditions. That is, the fast-idle mechanism increases the engine speed above the high reference level to allow the apparatus to shut off the fuel flow for the engine. As a result, the engine speed falls below the low reference level to cause the apparatus to admit the fuel flow to the engine. These conditions are repeated in a relatively short time at idle conditions. In order to avoid the above disadvantages, it is required to produce a fast-idle mechanism with extremely high accuracy, which results in a complex and expensive mechanism.

Furthermore, the engine may be operated, with its condition repeatedly changed between acceleration and deceleration, while the automotive vehicle is running with the transmission in low gear due to heavy traffic. The engine speed readily exceeds the high reference level with the accelerator pedal depressed and falls below the high reference level with the accelerator pedal released, causing the apparatus to cut off the fuel flow to the engine. Then, the engine speed immediately falls below the low reference level due to strong engine braking to cause the apparatus to allow the fuel flow to the engine. This spoils smooth vehicle running.

SUMMARY OF THE INVENTION

It is therefore one object of the present invention to provide an improved fuel cut-off control apparatus for use with a fuel supply system in which the flow of fuel to an internal combustion engine can be shut off without the drawbacks inherent in previous designs.

Another object of the present invention is to provide a fuel cut-off control apparatus of the character described which is effective to prevent hunting or the repeated interruption and admission of fuel to the engine.

Still another object of the present invention is to provide a fuel cut-off control apparatus of the character described which can improve the service life and exhaust gas purifying performance of the engine.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

For a better understanding of the invention, as well as other objects and further features thereof, reference is made to the following detailed description of the invention to be read in connection with the accompanying drawings, wherein.

DESCRIPTION OF THE PREFERRED EMBODIMENTS

Figure 1:
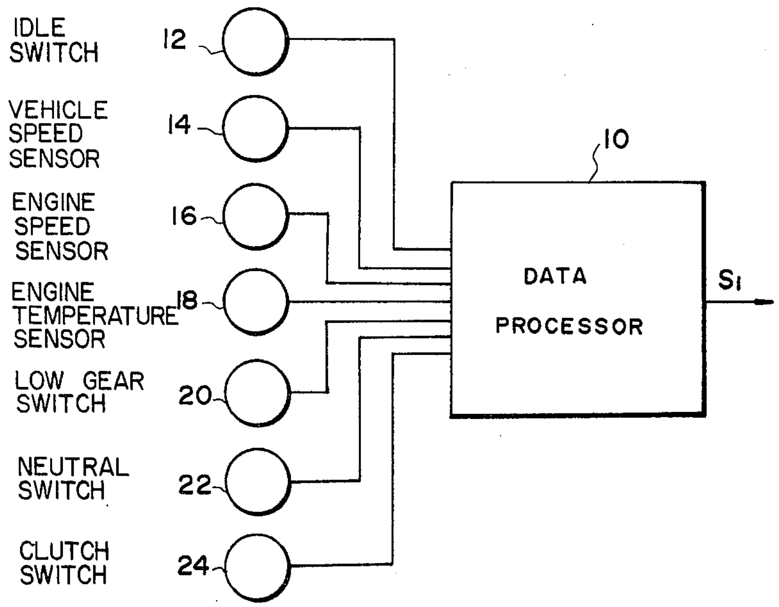
FIG. 1 is a block diagram showing one embodiment of a fuel cut-off control apparatus made in accordance with the present invention.

Referring now to FIG. 1 which is a block diagram of the fuel-cut control apparatus according to the present invention, a data processor 10 is provided for processing the data on various vehicle running conditions to provide a "fuel-cut" signal $S_1$ to a fuel injection control circuit (not shown) which thereby shuts off the flow of fuel from the fuel supply system to the engine. The data processor 10 may include a micro-computer which constitutes a part of the fuel injection control system for calculating the duration of injection of fuel for the engine in accordance with various engine operating parameters.

The data processor 10 is shown as having inputs from an idle switch 12, a vehicle speed sensor 14, an engine speed sensor 16, an engine temperature sensor 18, a low gear switch 20, a neutral switch 22, and a clutch switch 24. The idle switch 12 is adapted to become conductive when the accelerator pedal is released or the throttle valve is in its fully closed position. The vehicle speed sensor 14 is adapted to provide a signal indicative of vehicle running speed. The vehicle speed sensor 14 may be of the type including rotary means for rotation in synchronism with the output shaft of the transmission, a magnet mounted on the rotary means, magnetic-field responsive means such for example as a lead switch disposed near the rotary means for generating a pulse each rotation of the rotary means, and a counter for counting the pulses from the magnetic-field responsive means per unit time to detect the speed of running of the vehicle. For easy and rapid vehicle speed calculation, the counter may be associated with a micro-computer installed in the vehicle. Alternatively, the vehicle speed sensor 14 may be taken in the form of a Doppler rader or any other suitable conventional speed meter.

The engine speed sensor 16 is adapted to provide a signal indicative of engine rotational speed. The engine temperature sensor 18 is responsive to the temperature of engine coolant for providing a signal indicative of engine coolant temperature. The low gear switch 20 is turned on when the transmission is in its low or second gear position. The neutral switch 22 becomes conductive when the transmission is in its neutral position. The neutral switch 22 may be an inhibit switch if the transmission is of the automatic design. The clutch switch 24 is turned on when the clutch is released.

The operation of the data processor 10 will now be described in detail with reference to the flow charts of FIG. 2.

Figure 2:
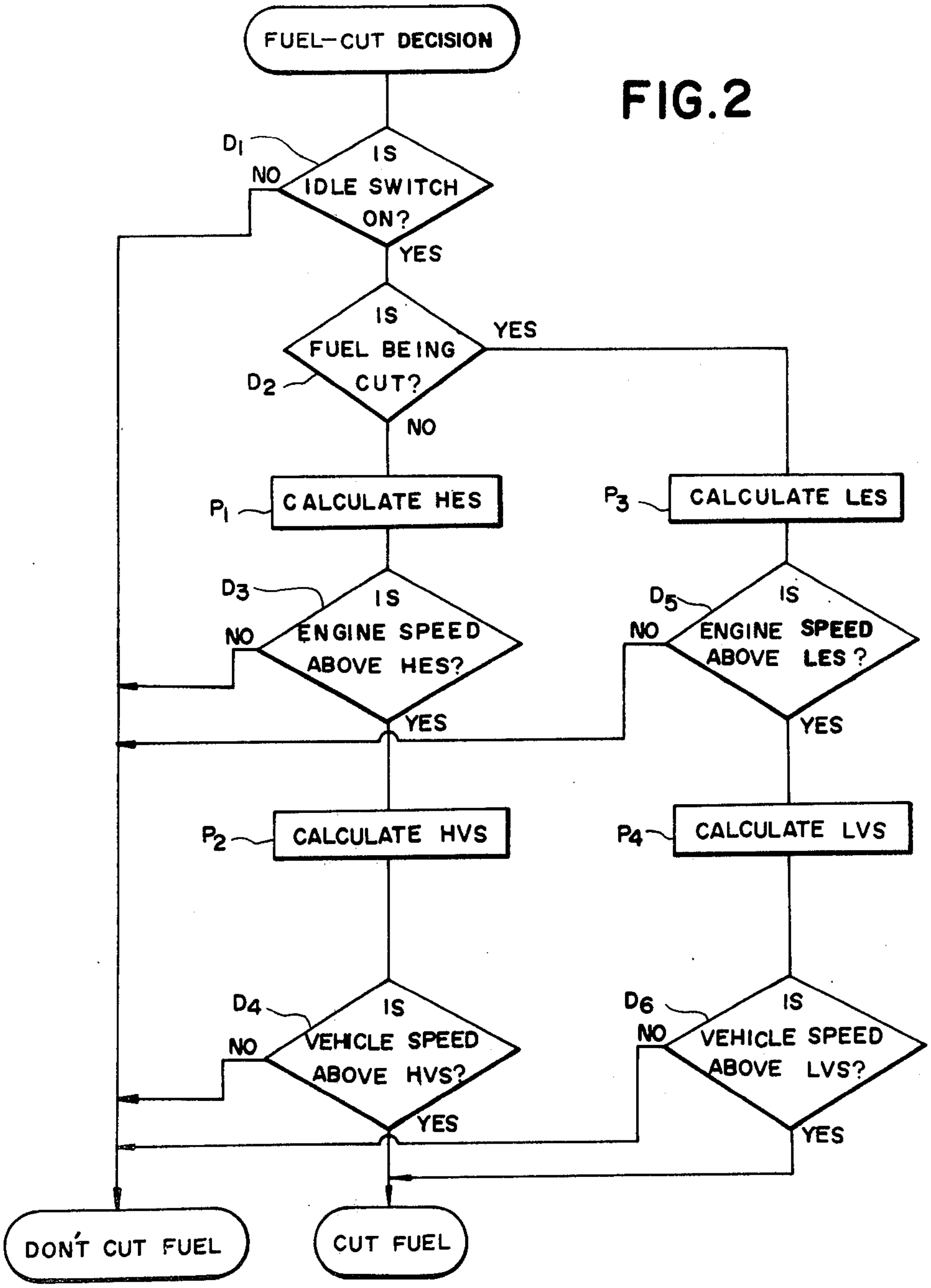
FIG. 2 is a flow chart used in explaining the operation of the present invention.

In the flow chart of FIG. 2, a decision $D_1$ is made whether the idle switch 12 is on or off. If the idle switch 12 is off, the data processor 10 provides at its output no "fuel cut-off" signal $S_1$ so that fuel is continuously supplied to the engine. When the idle switch 12 is on, an additional decision $D_2$ is made whether or not the flow of fuel to the engine is being cut off. If fuel is being supplied to the engine, the data processor 10 makes a process $P_1$ to calculate, in accordance with the engine temperature indicative signal from the temperature sensor 18, a high engine speed reference level HES at which the data processor 10 provides a fuel cut-off signal $S_1$, causing the fuel injection control circuit to shut off the fuel flow to the engine. The reference level HES varies to increase with a reduction in engine temperature. The data processor 10 may be designed such as to provide no "fuel cut-off" signal regardless of the magnitude of the high engine speed reference level HES if the engine temperature is below a level causing unstable engine rotation due to interruption of the fuel flow to the engine.

Subsequently, the data processor 10 makes a decision $D_3$ whether the actual engine speed ES, detected in accordance with the engine speed indicative signal from the engine speed sensor 14, is above or below the high engine speed reference level HES. If the engine speed ES is below the reference level HES, no "fuel cut-off" signal is provided. If the engine speed ES is above the reference level HES, the data processor 10 makes a process $P_2$ to calculate a high vehicle speed reference level HVS at which the data processor 10 provides a "fuel cut-off" signal $S_1$. The reference level HVS varies to increase as the engine temperature decreases. The data processor 10 may be designed such as to provide no "fuel cut-off" signal regardless of the reference level HVS if the engine temperature is below a level causing unstable engine rotation due to interruption of the fuel flow to the engine.

Then, the data processor 10 makes a decision $D_4$ whether the actual vehicle speed VS, detected in accordance with the vehicle speed indicative signal from the vehicle speed sensor 14, is above the high vehicle speed reference level HVS. If the vehicle speed VS is below the reference level HVS, no "fuel cut-off" signal is provided. If the vehicle speed VS is above the reference level HVS, a "fuel cut-off" signal is provided to the fuel injection control circuit which thereby shuts off the fuel flow to the engine.

If the fuel flow to the engine is being cut off in the decision $D_2$, the data processor 10 makes a process $P_3$ to calculate, in accordance with the engine temperature indicative signal from the temperature sensor 18, a low engine speed reference level LES at which the data processor 10 stops the generation of the "fuel cut-off" signal $S_1$ to the fuel injection control circuit. The reference level LES is lower than the reference level HES and varies to increase with a reduction in engine temperature.

Subsequently, the data processor 10 makes a decision $D_5$ whether the actual engine speed ES is above or below the low reference level LES. If the engine speed ES is below the low reference level LES, the data processor 10 stops the generation of the "fuel cut-off" signal to the fuel injection circuit. If the engine speed ES is above the low reference level LES, the data processor 10 makes a process $P_4$ to calculate, in accordance with the engine temperature indicative signal from the temperature sensor 18, a low vehicle speed reference level LVS at which the data processor 10 stops the generation of the "fuel cut-off" signal. The reference level LVS is lower than the reference level HVS and varies to increase as the engine temperature decreases.

Then, the data processor 10 makes a decision $D_6$ whether the actual vehicle speed VS is above or below the low vehicle speed reference level LVS. If the vehicle speed VS is below the low reference level LVS, the data processor 10 stops the generation of the "fuel cut-off" signal $S_1$. If the vehicle speed VS is above the low reference level LVS, the data prccessor 10 continues the generation of the "fuel cut-off" signal to the fuel injection control circuit.

Summarizing the operation of the data processor described with reference to the flow chart of FIG. 2, it provides a "fuel cut-off" signal when the idle switch is on, the engine speed is above a high engine speed reference level HES, and the vehicle speed is above a high vehicle speed reference level HVS, and it stops the generation of the "fuel cut-off" signal when the idle switch is off, the engine speed is below a low engine speed reference level LES lower than the high engine speed reference level HES, or the vehicle speed is below a low vehicle speed reference level LVS lower than the high vehicle speed reference level HVS. The reference levels HES, LES, HVS and LVS are variables dependent upon engine temperature.

Figure 3:
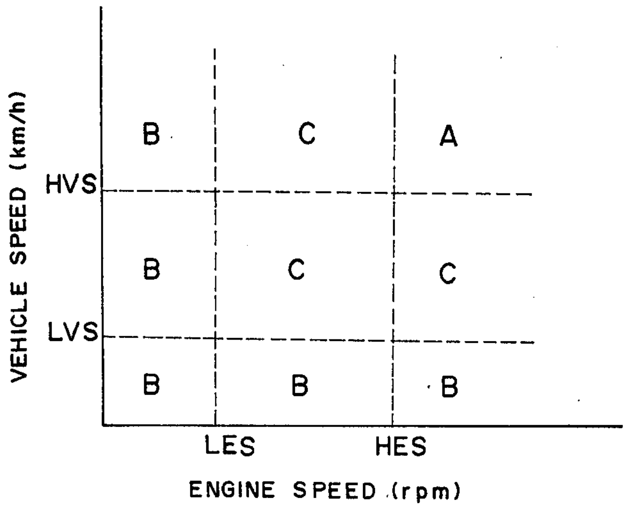
FIG. 3 is a diagram showing the range where the flow of fuel to an engine is cut off.

FIG. 3 shows the operation of the data processor with the idle switch being on. In FIG. 3, the letter A indicates the condition where the data processor provides a "fuel cut-off" signal to the fuel injection control circuit, the letter B the condition where the data processor stops the generation of the "fuel cut-off" signal, and the letter C the hysterical transient condition where the data processor continues to provide a "fuel cut-off" signal if the engine and vehicle speeds shift from the condition A to the condition B and it continuously stops the generation of the "fuel cut-off" signal if the engine and vehicle speed shift from the condition B to the condition A. The high and low engine speed reference levels HES and LES and the high and low vehicle speed reference levels HVS and LVS are variables dependent upon engine temperature.

As described above, the data processor is adapted to provide a "fuel cut-off" signal $S_1$ to the fuel injection control circuit in accordance with vehicle speed as well as engine speed so that there is no "fuel cut-off" signal regardless of the engine speed if the vehicle stops or is at low speeds. This is effective to prevent occurence of hunting to repeat interruption and admission of the flow of fuel to the engine at engine warming-up conditions and while the vehicle is running with the transmission placed in its low gear position. The provision of the hysterical transient region is further effective to prevent such hunting.

Figure 4:
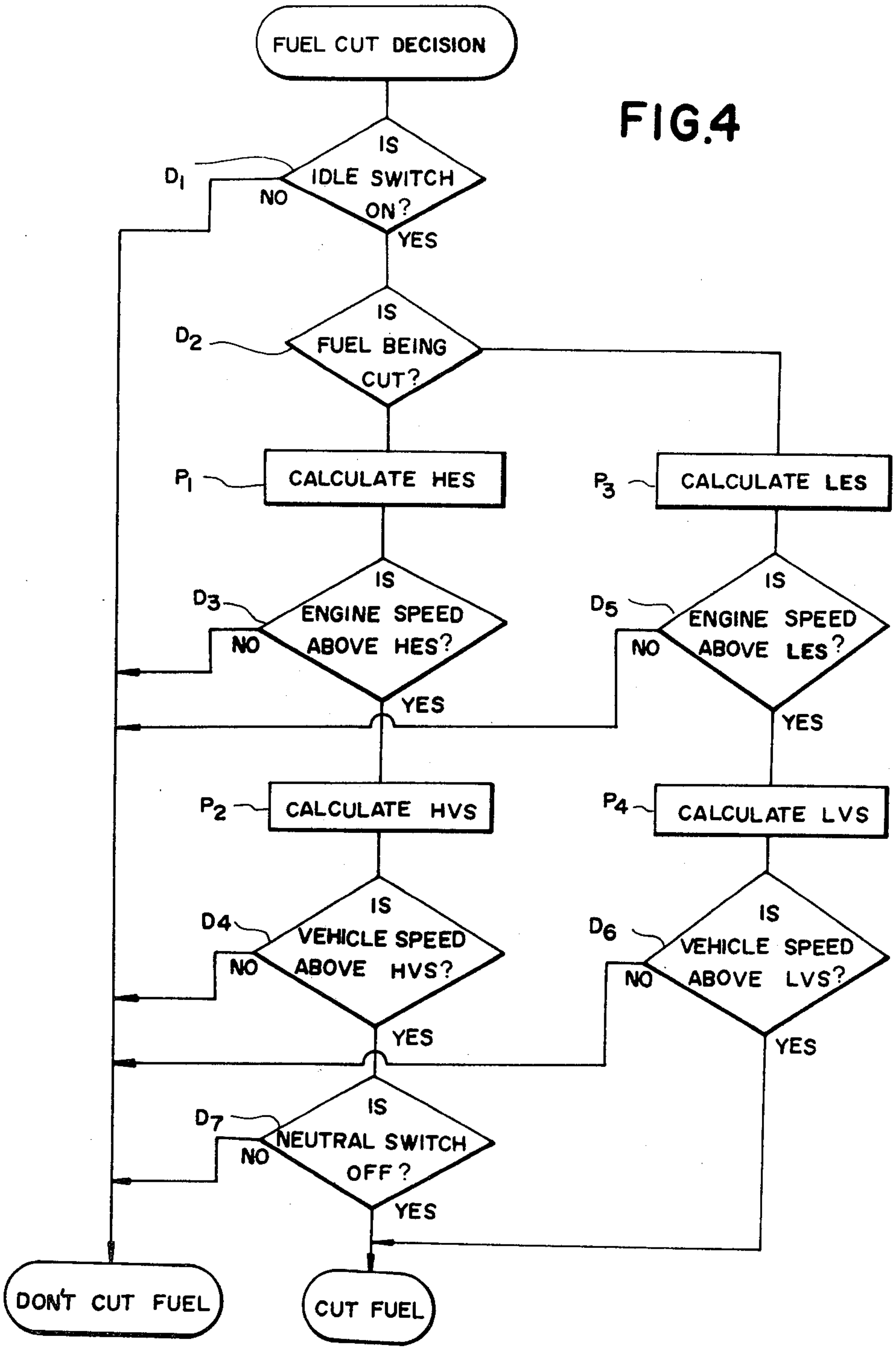
FIG. 4 is a flow charts used to explain a modified operation of the present invention.

Referring to FIG. 4, there is illustrated a modified form of the data processor which makes an additional decision $D_7$ whether the neutral switch 22 is on or off. If the neutral switch 2 is on, the data processor 10 stops the generation of the "fuel cut-off" signal to the fuel injection control circuit regardless of the establishment of the above described engine and vehicle speed conditions under which the data processor will provide a "fuel cut-off" signal $S_1$.

The provision of the decision $D_7$ is due to the fact that when the gear position of the transmission is changed from one to another, the idle switch is normally turned on and the data processor starts providing a "fuel cut-off" signal to the fuel injection control circuit if the other engine and vehicle speed conditions are established, but such interruption of the fuel flow to the engine spoils the engine drivability which would lead to engine stall. Furthermore, a rapid engine speed drop occurs during deceleration after the engine is raced when the engine output shaft is disconnected from the load (drive shaft), i.e., when the transmission is in its neutral position or the clutch is released. Accordingly, it is desirable to avoid such interruption of the fuel flow to the engine. For this purpose, the data processor is arranged to stop the generation of the "fuel cut-off" signal when the transmission is in its neutral position or the clutch is released. The neutral switch may be substituted with the clutch switch.

It is to be noted that the data processor 10 may be operated in connection with the gear switch 20 so as to stop the generation of the "fuel cut-off" signal to the fuel injection control circuit when the gear switch 20 is on, i.e., when the transmission is in its low gear position in order to provide smooth vehicle running while the vehicle is running with the transmission placed in its low gear position.

It is also to be noted that the fuel-cut control apparatus of the present invention is applicable to fuel injection systems, carburetors, and any other suitable fuel supply systems.

With the fuel cut-off control apparatus of the present invention, it is possible to provide stable fuel supply to an engine without hunting or the resulting repeated interruption and admission of the flow of fuel to the engine. This elongates the service life of the engine and improves the exhaust gas purifying characteristics.

While this invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A fuel supply system for supplying fuel to an internal combustion engine in an automotive vehicle, comprising:

(a) a first sensor for sensing a closed position of a throttle valve;

(b) a second sensor for sensing the speed of rotation of said engine;

(c) a third sensor for sensing the speed of said vehicle;

(d) a control circuit for providing first and second signals in accordance with the sensed engine operating conditions, said control circuit being adapted to compare, in the presence of the second signal, the engine speed with a first engine speed reference level and the vehicle speed with a first vehicle speed reference level and to change said second signal to said first signal when (i) said throttle valve is in its closed position, (ii) said engine speed is above said first engine speed reference level, and (iii) said vehicle speed is above said first vehicle speed reference level;

said control circuit being operable to compare, in the presence of said first signal, the engine speed with a second engine speed reference level lower than the first engine speed reference level and the vehicle speed with a second vehicle speed reference level lower than the first vehicle speed reference level and to maintain the first signal only when (i) the throttle valve is in its closed position, (ii) the engine speed is above the second engine speed reference level, and (iii) the vehicle speed is above the second vehicle speed reference level; and (e) means responsive to the first signal from said control circuit for cutting off the supply of fuel to said engine, said means being responsive to the second signal from said control circuit for resuming the supply of fuel to said engine.

2. The fuel supply system according to claim 1, wherein said control circuit increases the magnitude of each of the first and second engine speed reference levels and the first and second vehicle speed reference levels in accordance with engine temperature.

3. The fuel supply system according to claim 2, wherein said control circuit increases the magnitude of each of the first and second engine speed reference levels and the first and second vehicle speed reference levels as the engine temperature decreases.

4. The fuel supply system according to claim 1 or 2 or 3, wherein said control circuit constantly provides the second signal when the engine temperature is below a predetermined level.

5. The fuel supply system according to claim 1 or 2 or 3, wherein said control circuit changes the first signal to the second signal when said engine is disconnected from a load.

6. The fuel supply system according to claim 4, wherein said control circuit changes the first signal to the second signal when said engine is disconnected from a load.

7. The fuel supply system according to claim 5, wherein said control circuit changes the first signal to the second signal when a transmission is in its neutral position.

8. The fuel supply system according to claim 6, wherein said control circuit changes the first signal to the second signal when a transmission is in its neutral position.

9. The fuel supply system according to claim 5, wherein said control circuit changes the first signal to the second signal when a clutch is released.

10. The fuel supply system according to claim 6, wherein said control circuit changes the first signal to the second signal when a clutch is released.

* * * * *